United States Patent
Rakutt et al.

(10) Patent No.: US 12,083,698 B2
(45) Date of Patent: Sep. 10, 2024

(54) METHOD AND DEVICE FOR PRODUCING A HARD-FOAM FILM

(71) Applicant: Airex AG, Sins (CH)

(72) Inventors: Dietmar Rakutt, Cham (CH); Martin Gaul, Birrhard (CH); Franz Burkard, Alikon (CH)

(73) Assignee: Airex AG, Sins (CH)

( * ) Notice: Subject to any disclaimer, the term of this patent is extended or adjusted under 35 U.S.C. 154(b) by 0 days.

(21) Appl. No.: 17/639,272

(22) PCT Filed: Jul. 23, 2020

(86) PCT No.: PCT/EP2020/070859
§ 371 (c)(1),
(2) Date: Feb. 28, 2022

(87) PCT Pub. No.: WO2021/043503
PCT Pub. Date: Mar. 11, 2021

(65) Prior Publication Data
US 2022/0332002 A1  Oct. 20, 2022

(30) Foreign Application Priority Data
Sep. 2, 2019  (EP) .................................. 19194898

(51) Int. Cl.
*B26D 3/00* (2006.01)
*B26D 1/46* (2006.01)
(Continued)

(52) U.S. Cl.
CPC ............... *B26D 3/006* (2013.01); *B26D 1/46* (2013.01); *B26D 3/28* (2013.01); *B26D 7/10* (2013.01);
(Continued)

(58) Field of Classification Search
CPC . B26D 1/46; B26D 3/006; B26D 3/28; B26D 5/32; B26D 7/10; B26D 7/18;
(Continued)

(56) References Cited

U.S. PATENT DOCUMENTS 10,065,332 B2  9/2018  Leyens et al.
2006/0257612 A1*  11/2006  Rakutt ..................... B32B 3/12
156/304.6

FOREIGN PATENT DOCUMENTS

CN  102655994 A  9/2012
CN  107000236 A  8/2017
(Continued)

OTHER PUBLICATIONS

Translation WO2011083037 (Year: 2024).*
(Continued)

*Primary Examiner* — Nhat Chieu Q Do
(74) *Attorney, Agent, or Firm* — Bachman & LaPointe, P.C.

(57) ABSTRACT

A method for producing a hard-foam film, for use as a core layer in sandwich composite elements, having an increased compressive strength along a thickness extension extending perpendicularly to its surface extension, from a foam block (3) of a thermoplastic, extruded, in particular partially crystalline and/or closed-cell, plastic rigid foam material, PET.

15 Claims, 2 Drawing Sheets

(51) Int. Cl.
*B26D 3/28* (2006.01)
*B26D 7/10* (2006.01)
*B26D 7/18* (2006.01)
*B32B 5/18* (2006.01)

(52) U.S. Cl.
CPC .............. *B26D 7/18* (2013.01); *B32B 5/18* (2013.01); *B32B 2250/40* (2013.01); *B32B 2266/0264* (2013.01); *B32B 2266/08* (2013.01)

(58) Field of Classification Search
CPC ........ B32B 2250/40; B32B 2266/0264; B32B 2266/08; B32B 5/18; B26F 3/08
USPC ............................................................ 83/15
See application file for complete search history.

(56) References Cited

FOREIGN PATENT DOCUMENTS

| | | | | |
|---|---|---|---|---|
| CN | 109079893 A | 12/2018 | | |
| DE | 102008046878 B3 | 2/2010 | | |
| DE | 102011084987 A1 | 4/2013 | | |
| DE | 102013221047 A1 * | 4/2015 | ............. | B26D 3/006 |
| EP | 1536944 B2 | 10/2011 | | |
| EP | 2998038 A1 * | 3/2016 | ........... | B09B 3/0083 |
| JP | S5590332 A * | 7/1980 | | |
| JP | H06190800 A | 7/1994 | | |
| JP | 2001310293 A | 11/2001 | | |
| JP | 2005305637 A | 11/2005 | | |
| WO | 2004024434 A1 | 3/2004 | | |
| WO | WO-2011083037 A1 * | 7/2011 | ............... | B26D 3/28 |
| WO | 2016078902 A1 | 5/2016 | | |

OTHER PUBLICATIONS

Gaugler & Lutz Ohg. "Ihr starker Partner im Bereich Kernmaterialien fur den Leicht-und Sandwichbau Know-how aus uber 30 Jahren Erfahrung am Markt Produktubersicht", Internet, Sep. 30, 2017 (Sep. 30, 2017), pp. 6-10, Retrieved from the Internet: https://docplayer.org/61859392-Produktuebersicht-stand-09-2017-ihr-starker-partner-im-bereich-kernmaterialien-fuer-den-leicht-und-sandwichbau.html.

Airex Ag. "www.3ACcorematerials.com Europe ??? Middle East ??? India ??? Africa ??? " Feb. 28, 2017 (Feb. 28, 2017), Retrieved from the Internet: https://wwww.3accorematerials.com/uploads/images/AIREX-Processing-Guidelines_02.2017_EN_1106.pdf.

JEC World 2018 preview: 3A Composites, Materials Core, Feb. 24, 2018.

International search report for patent application No. PCT/EP2020/070859 dated Oct. 5, 2019.

* cited by examiner

METHOD AND DEVICE FOR PRODUCING A HARD-FOAM FILM

CROSS-REFERENCE TO RELATED APPLICATIONS

This application is a 371 of PCT/EP2020/070859, filed Jul. 23, 2020 which claims priority to EP 19194898.3, filed Sep. 2, 2019.

BACKGROUND OF THE INVENTION

The invention relates to a method for producing a rigid-foam film, in particular for use as a core layer in sandwich composite elements, in which the compressive strength perpendicular to its surface extension, i.e., perpendicular to the parallel side surfaces having the largest area compared to the other side surfaces (and therefore in the direction of its thickness direction) is higher than parallel to its surface extension, from a foam block made of a thermoplastic, extruded, in particular partially crystalline and/or closed-cell, PET-plastic rigid-foam material, the method comprising the steps of providing the foam block whose plastic rigid-foam material has a higher compressive strength along a thickness extension axis than in a surface extension extending perpendicular thereto (the thickness extension axis preferably being or coinciding with a stretching axis along which the plastic rigid-foam material of the foam block has a stretched polymer structure); obtaining (separating) the rigid-foam film from the foam block by separating a film section from the foam block by cutting the foam block along a feed axis extending perpendicular to the thickness extension axis by means of a knife having a cutting edge, which preferably extends perpendicular to the feed axis and perpendicular to the thickness extension axis, the film section becoming longer over the duration of the cutting process along the feed axis; and lifting (i.e., deforming away) the separated film section from the knife by elastic bending of the film section, in particular around a bending axis extending perpendicular to the thickness extension axis and to the feed axis and therefore preferably parallel to the longitudinal extension of the cutting edge, to reduce the friction forces acting on the knife during the cutting process. As mentioned above, the rigid-foam film is characterized in that its compressive strength perpendicular to its surface extension is higher than parallel to its surface extension—it is assumed that a polymer structure which is stretched in the extrusion direction perpendicular to the surface extension is the reason for this increased compressive strength.

For the purpose of the following description, it is to be assumed that the plastic rigid-foam material is PET-plastic rigid-foam material, unless otherwise stated.

Furthermore, the invention relates to a rigid-foam film which is preferably produced by means of a method according to the invention, the film being made of a thermoplastic, extruded, in particular partially crystalline and/or closed-cell plastic rigid-foam material having a polymer structure stretched perpendicular to the rigid-foam film surface extension and therefore in the direction of its thickness extension, the rigid-foam film having at least one surface side (preferably two parallel surface sides of this kind) obtained by a knife cutting process (in particular no hot element cutting process such as a hot wire cutting process) and a minimum thickness extension of 0.5 mm, preferably of 3 mm, more preferably of 4 mm, particularly preferably of 5 mm, and/or of less than 10 cm, preferably less than 5 cm, more preferably less than 1 cm, particularly preferably of 1 mm to 5 mm, measured perpendicular to the surface extension, i.e., in the direction of the thickness extension axis.

Moreover, the invention relates to a sandwich composite element comprising such a rigid-foam film and to a rigid-foam cutting device.

PET rigid-foam films are known which are directly extruded in the intended thickness extension and which then have a polymer structure which is stretched in the extrusion direction and therefore perpendicular to the thickness extension, i.e., along the surface extension. The low compressive strength perpendicular to the surface extension is disadvantageous, which makes such films less suitable as a core layer in sandwich composite elements. Such PET rigid-foam films are used, inter alia, in thermoforming processes for forming containers, in particular in the form of trays for receiving food products.

Additionally, flexible foams are known which can generally be peeled in all directions without any problems, regardless of any anisotropy of the mechanical properties.

Furthermore, for structural applications, in particular for use as a core layer in sandwich composite elements, rigid-foam films have become known which have a polymer structure which is stretched in the direction of their thickness extension, i.e., perpendicular to their surface extension, for receiving relatively high compressive loads perpendicular to their surface extension. Because of the related high material loss, such rigid-foam films are not obtained by sawing but by cutting from a foam block by means of a knife, said foam block being producible as described in EP 1 536 944 B2, for example. To this end, a rigid-foam sheet is first obtained by extrusion, which is divided into several body segments which are then connected to one another at their surface sides. If a foam block obtained in this way is now sliced perpendicular to the surface extension of the connecting surfaces, the slices have the intended polymer structure which is stretched perpendicular to their surface extension as a result of the extrusion process.

When using knives for the production of the slices or rigid-foam films mentioned above, the problem is that, without further measures, the respective separated film section would slide over the part of the knife adjacent to the cutting edge and would clamp the knife in this way. The resulting friction forces would lead to problems during the cutting process—in particular, the cutting process could stop or the friction forces could prevent the knife from being displaced or moved perpendicular to the feed axis and perpendicular to the thickness extension axis, as is necessary for a cutting process. Additionally, the heating of the knife would be too high, which is to be avoided to prevent melting of the plastic foam material and thus sealing of the cut surfaces of the rigid-foam film. To avoid such friction problems, the respective film section, which has already been separated from the remaining foam block by means of the knife, is bent away from the knife, i.e., lifted from the knife behind the cutting edge. This bending process is reversible, i.e., elastic. In practice, however, the bending of a rigid-foam film is only possible up to a very limited thickness extension of approximately 1 mm. The method fails in the case of thicker rigid-foam films—the rigid-foam film breaks; for this reason, it has not yet been possible to produce thicker rigid-foam films which have a polymer structure which is stretched perpendicular to their surface extension by means of a knife cutting process. However, the demand for such rigid-foam films, in particular having a thickness extension of at least 0.5 mm or more, would be high, in particular for industrial applications.

U.S. Pat. No. 10,065,332 B2 relates to a device for splitting foam bodies, layers being separated from a foam body by means of a band knife guided or surrounded by guide plates and being transferred onto a discharge device or a removal device WO 2016 078 902 A1 relates to a method for planar division of PE, PP, PVC, PMMA or P(M)I rigid-foams to obtain films or thin sheets, the rigid-foams being first flexibilized and then cut with a knife, flexibilization of the rigid-foam prior to cutting being accomplished by storing the rigid-foam in water and/or heating or adjusting it to a temperature of 15° C. at minimum and 1° C. at maximum below the foaming temperature of the rigid-foam. The disclosure does not include any indication that PET-plastic rigid-foam material can also be processed by means of the method. Additionally, the foaming temperature of such rigid-foam materials is usually significantly higher than the melting temperature or the glass transition temperature.

EP 1 536 944 B2 relates to a planar structural element for core layers of sandwich composite elements. DE 10 2008 046878 B3 discloses a composite having a PET foam core layer. DE 10 2011 084 987 A1 discloses a cutting machine having a rotating band knife.

SUMMARY OF THE INVENTION

Hence, starting from the state of the art mentioned above, the object of the invention is to indicate a method and a device by means of which rigid-foam films of essentially any thickness can be separated from a foam block by means of a knife, wherein the compressive strength of the resulting rigid-foam film parallel to its thickness extension, i.e., perpendicular to its surface extension, is to be higher than parallel to the surface extension. Furthermore, the object is to indicate such a rigid-foam film and a sandwich composite element produced therewith.

With respect to the method, said object is attained by the features as disclosed herein; i.e., in a generic method, the object is attained in that the plastic rigid-foam material, in particular the foam block and/or the separated film section is at least partially heated to a processing temperature above 40° C. and below the melting temperature of the plastic rigid-foam material in such a manner that the plastic rigid-foam material becomes so elastically bendable (by the heating) that the separated film section can be lifted (reversibly or elastically deformed away) from the knife after passing the cutting edge of the knife. The polymer molecule stretching axis extends preferably parallel to the rigid-foam film dimension having the smallest extension, i.e., in the direction of the thickness extension. The compressive strength of the separated film section is highest in the direction of the thickness extension, i.e., higher than in the surface extension extending perpendicular thereto.

With respect to the device, the object is attained by the features as disclosed herein; i.e., in a generic rigid-foam film cutting device, the object is attained in that heating means are provided which are configured to at least partially heat the plastic rigid-foam material, in particular the foam block and/or the separated film section, to a processing temperature above 40° C. and below the melting temperature of the plastic rigid-foam material in such a manner that the plastic rigid-foam material becomes so elastically bendable that the separated film section can be lifted from the knife by elastic bending after passing the cutting edge of the knife.

With respect to the rigid-foam film, the object is attained by the features disclosed herein, and with respect to the sandwich composite element, the object is attained by the features also as disclosed herein.

Advantageous embodiments are described in the dependent claims. All combinations of at least two features disclosed in the description, the claims and/or the figures constitute part of the scope of the invention.

In order to avoid repetitions, disclosed features relating to the method are also seen as relating to the device and are thus also claimable therefor. In the same manner, disclosed features relating to the device are also seen as relating to the method and are thus also claimable therefor.

The invention is based on the idea of producing or ensuring the elastic (reversible) deformation, i.e., the bendability, of the plastic rigid-foam material, specifically of the foam block and/or of the already separated film section, in a generic rigid-foam film production method or a generic rigid-foam film cutting device by supplying thermal energy to a processing temperature above the room temperature. The processing temperature is chosen in such a manner or the corresponding heating means are configured to heat the plastic rigid-foam material to such a processing temperature that said temperature is higher than 40° C. and lower than the melting temperature of the plastic rigid-foam material in such a manner that the plastic rigid-foam material becomes so elastically bendable (compared to a room temperature of 22° C.) that the separated film section can be lifted from the knife by elastic bending, in particular around a bending axis extending perpendicular both to the feed axis and to the thickness extension axis, after passing the cutting edge of the knife. In other words, according to the invention, the plastic rigid-foam material is heated (to a suitable processing temperature) in such a manner in the course of a knife plastic rigid-foam material cutting process in which the foam block and the knife are displaced relative to one another in the feed axis (which preferably extends perpendicular to the longitudinal extension of the cutting edge of the knife) that the separated film section, in particular even in the case of a thickness extension of at least 0.5 millimeters (measured perpendicular to the surface extension of the film section), becomes so elastically bendable that the separated film section can be lifted or bent away from the, in particular planar, knife after passing the cutting edge in order to thus prevent or at least to reduce friction effects on the knife. In the case of thick films, in particular those which have thicknesses of 2 mm or 3 mm or more, the required elastic bendability is only produced or ensured by the heating step to the processing temperature. The heating of the plastic rigid-foam material to the (increased) processing temperature is not only advantageous with respect to a resulting facilitated bendability. Additionally, the hardness of the material is reduced by the introduction of the thermal energy, so that the knife can cut into the rigid-foam plastic material better or more easily/with less resistance and the cutting pressure decreases. After all, if the cutting pressure is too high, the knife tries to evade the pressure and moves up and down, limited by possible knife clamping, which can lead to "impacts" into the material. This is avoided by the heating. Additionally, the risk that the knife is destroyed by a cutting pressure (knife pressure) which is significantly too high is avoided. The foam block used in a method according to the invention is characterized in that it has a greater compressive strength in the direction of the thickness extension axis than perpendicular thereto, i.e., than along the feed axis and than along the longitudinal extension of the cutting edge of the knife used, i.e., than along the knife movement axis. Preferably, the increased compressive strength along the thickness extension axis is obtained by or results from a stretching of the polymer structure of the rigid-foam material of the foam block along the thickness extension axis, which then coincides with a stretching axis.

As will be explained below, different options are available with respect to the specific realization of the heating step. For instance, it is conceivable that the foam block is heated, in particular in its entirety, before and/or during the cutting process in a corresponding environment, in particular in an oven, until the processing temperature is reached, which allows reversible bending of the separated film section away from the knife, in particular even in the case of greater thickness extensions of at least 0.5 mm, preferably at least 3 mm, particularly preferably at least 4 mm, more preferably at least 5 mm, and/or of less than 10 cm, preferably less than 5 cm, more preferably less than 1 cm. As an alternative to heating the foam block in batches in an oven, it is possible to heat the foam block, in particular partially by heat radiation, in particular by means of an IR radiator or infrared heating means, preferably in front of and/or behind and/or in a contact area of the foam block to the cutting edge of the knife along the feed axis. The advantage of this approach is that the foam block does not have to be heated completely, but essentially only at the surface to a depth corresponding to the thickness extension of the rigid-foam film to be separated.

Accordingly, an advantageous embodiment of the method provides that the heating is carried out by means of an infrared heating means, the infrared heating means being adapted to the PET-plastic rigid-foam material in such a manner that a penetration depth of the infrared radiation is at least equal to a thickness or a thickness extension of the film section to be separated or of the rigid-foam film to be separated. The appropriate choice of the infrared heating means with regard to the PET-plastic rigid-foam material has the effect that a respective superficial layer is heated or warmed quickly by primary heat transfer, i.e., not by heat convection, into the foam block, i.e., directly after the irradiation of the infrared radiation, or at least more quickly than by heat convection, the thickness or thickness extension of said layer corresponding at least to the layer thickness, thickness or thickness extension of the rigid-foam film to be separated or of the film section to be separated. This ensures that even in the case of iterative partial heating of the foam block, in each case before the corresponding cutting process, heating is provided in the surface area of the foam block for a short time and at the same time to a sufficient depth in the thickness extension. For a plurality of PET-plastic rigid-foam materials, it has proven advantageous in this context for the infrared heating means to have a short-wave proportion of 0.7 µm to 2 µm wavelength, which provides at least 20% of the radiant power, and that infrared heating means further have a long wave proportion which has a wavelength of more than 4 µm and which for its part does not provide or account for more than 35% of the radiant power. Such an infrared radiator or an infrared heating means can have the effect that the penetration depth of the infrared radiation corresponds at least to the thickness extension of the rigid-foam film to be separated or of the film section to be separated in the range of the preferred thickness extensions mentioned above, particularly preferably in a range of thickness extensions of up to 10 mm of the rigid-foam film to be separated.

Moreover, another particularly preferred embodiment of the method can provide that a surface temperature of the foam block is measured, preferably in a contactless manner, at a position disposed in front of the cutting edge and in front of the position of a heating means provided for the heating, in particular of an infrared heating means, in the feed axis and the measured surface temperature serves as an input variable for controlling the radiant power of the heating means, in particular of the infrared heating means. Said embodiment is based on the knowledge that too great a heat input into the foam block can have an adverse effect on the film section to be separated or on the rigid-foam film to be separated. In particular, too great a heat input can lead to unintended waviness of the separated film sections; accordingly to the current state of knowledge, said waviness is associated with the corresponding thermal expansion of the material on the one hand and with the limited expansion possibilities within the device on the other hand. Accordingly, the controlled irradiation of thermal energy, in particular the controlled irradiation of infrared radiation, ensures that, while on the one hand the surface of the foam block and the area of the foam block located under the surface have an increased temperature which allows an advantageous lifting of the separated film or the separated film section, but at the same time the amount of heat or the heat input does not exceed an upper limit which results in reduced quality in the separated film sections.

More preferably, the surface temperature can be determined by means of a temperature sensor for contactless temperature measurement. To this end, a pyrometer can be used, for example. More preferably, the distance between the measurement position or of the measurement point of the surface temperature in relation to the heating means, in particular the infrared heating means, and the chosen feed rate are chosen in such a manner in the feed direction of the foam block that the time between the detection of the surface temperature via the generation of a corresponding control variable for influencing the radiant power of the heating means, in particular of the infrared heating means, is chosen in such a manner in relation to the feed rate and taking into account the settling time or the setting time of a changed radiant power on the part of the heating means that a radiant power adapted to the measured surface temperature acts on the surface of the foam block when the corresponding area or the corresponding section of the surface of the foam block enters the area of the heat radiation generated by the heating means, in particular by the infrared heating means. This ensures that the adapted radiant power is matched to the measured surface or surface temperature in each case. Accordingly, if the feed rate is varied, either the measurement point of the surface temperature can be varied or, if possible, the control variable for setting the radiant power of the heating means can be provided with a delay or is passed on to the heating means with a delay.

Accordingly, at the device level, a control unit for controlling the radiant power of the heating means, in particular of the infrared heating means, depending on at least one control variable, in particular depending on a measured surface temperature of the foam block, can advantageously be provided in addition to a corresponding temperature sensor, the surface temperature of the foam block being determined or measured at a position in front of the cutting edge and in front of the position of the heating means, in particular infrared heating means, in the feed axis.

Moreover, another particularly preferred embodiment of the method and of the device can provide that another temperature sensor measures the surface temperature of the foam block at a position downstream of the heating means, in particular of the infrared heating means, with respect to the feed direction, the measured temperature being used and documented, if applicable, merely as a verification of a heat input into the foam block which is sufficiently strong but not too great. Alternatively, however, the surface temperature of the foam block which is measured behind the heating means, in particular behind the infrared heating means, in relation to the feed axis and to the feed direction and which is preferably measured, preferably in a contactless manner, via another temperature probe or another temperature sensor, can also be used as another control variable for controlling the radiant power of the heating means and can be supplied or provided to a corresponding control unit for this purpose.

In contrast to known hot element cutting processes, in particular hot wire cutting processes, the knives are preferably knives through which no electric current flows and/or which are not actively heated—the only temperature increase preferably results from the mechanical friction effects during the cutting process and/or from the ambient temperature.

The cutting process is preferably performed in such a manner that the knife and the foam block are moved or displaced relative to one another not only along the feed axis, i.e., in particular perpendicular to the longitudinal extension of the cutting edge within the foam block, but that a relative movement between the foam block and the knife perpendicular to the feed axis and perpendicular to the thickness extension axis is additionally realized, for example in the form of a back and forth movement of the knife and/or of the foam block along the knife movement axis mentioned above or by driving the knife in a rotation direction if the knife is realized as a knife rotating in the rotation direction, in particular as a band knife. The latter alternative is preferred because the knife, which is designed as a rotating knife in this case, has sufficient time to cool down before a new contact of a rotating section after a cutting contact with the foam block. Preferably, the temperature in the cutting area or in the area of the cutting edge of the knife does not exceed the melting temperature of the plastic rigid-foam material during the cutting process to prevent sealing or partial sealing of the cut surface, i.e., of the surface sides of the rigid-foam film.

To cut the (rigid) foam block in a particularly convenient and smooth manner, it has proven advantageous for the plastic rigid-foam material, in particular the foam block and/or the separated film section, to be completely or partially heated to a processing temperature above the glass transition temperature of the plastic rigid-foam material minus 20° C., preferably minus 15° C., more preferably minus 10° C., particularly preferably minus 5° C. and particularly preferably to a processing temperature above the glass transition temperature. To avoid collapse or destruction of the foam outside the immediate cutting area already at temperatures below the melting temperature of the rigid-foam material in the case of rigid-foam additives, it has proven advantageous for the processing temperature to be chosen to be below 210° C., preferably below 180° C., more preferably below 150° C.

According to a first embodiment, the cutting edge of the knife is a straight line, i.e., free of saw teeth. According to an alternative embodiment, the knife can also be serrated—it is essential that chip formation is minimized or avoided as far as possible.

The material thickness of the knife measured perpendicular to a cutting edge longitudinal extension and perpendicular to a cutting knife depth extending perpendicular thereto is preferably chosen from a value range between 0.5 mm and 3 mm and is particularly preferably 1 mm. The effective cutting edge length is preferably chosen to be longer than 0.5 m and particularly preferably from a value range between 0.9 m and 3 m, preferably between 0.9 m and 2.5 m, more preferably between 1 m and 2 m, even more preferably between 1 m and 1.5 m. The knife depth which is measured relative to the foam block in the feed direction of the knife and which extends perpendicular to the material thickness and perpendicular to the cutting edge length is preferably chosen from a value range between 30 mm and 150 mm, particularly preferably between 40 mm and 100 mm.

The elastic bending is particularly preferably performed in such a (reversible) manner that, except for interactions of the plastic rigid-foam material with the cutting edge of the knife, if applicable, no plastic dimensional change, preferably no plastic forming, of the rigid-foam film results during the cutting process. In other words, the dimension of the rigid-foam film is changed neither along the thickness extension axis nor along the feed axis nor along the knife movement axis by the bending step and/or the heating step.

The cutting angle in the cutting process is preferably chosen from a value range between 5° and 30°, in particular between 8° and 20°.

It has proven particularly advantageous for the foam block and/or the plastic rigid-foam material and/or the rigid-foam film to have a density from a value range between 40 kg/m$^3$ and 250 kg/m$^3$.

Within the scope of the invention, a rigid-foam material according to DIN 7726 (DIN 7726 is a standard which defines and classifies foam-materials) is a plastic foam material which has a compressive stress of more than 80 kPa at a compression by 10%. The plastic rigid-foam material is particularly preferably characterized in that a cuboid having the edge lengths 20 cm×2.5 cm×2.5 cm breaks if it is wrapped around a cylinder having a diameter of 2.5 cm at a temperature between 15° C. and 25° C., namely at a constant winding speed of one revolution/turn per 5 seconds according to standard ASTM D 1566-82.

The foam block is particularly preferably composed of a plurality of extruded body segments, the body segments being connected, in particular welded and/or bonded, to one another at their contacting surface sides, parallel or crossing stiffening webs being formed as a result when viewing a surface side of the rigid-foam film or of the foam block along the thickness extension axis of the polymer structures of the body segments. With respect to an option to form the foam block by welding, explicit reference is made to EP 1 536 944 B2, which is to be deemed disclosed as belonging to the present disclosure in this regard—here, the body segments are welded to one another in such a manner that a net-like web structure having a stiffening effect results from crossing weld seams. Alternatively, it is possible to connect the body segments in such a manner that stiffening webs, i.e., weld seams, which do not cross but are only parallel to one another result, in particular if foam blocks having a small volume are realized. If a welding process is realized, the weld seams, i.e., the stiffening webs, have few pores or are free of pores, preferably no adhesive material being contained. Alternatively, it is conceivable that parallel or crossing stiffening webs are created by bonding the body segments to one another—in principle, a combination of welding and adhesive processes is also conceivable, parallel weld seams and parallel adhesive surfaces extending perpendicular thereto being provided, for example. It is also possible to use foam blocks without stiffening webs whose compressive strength perpendicular to their surface extension is higher than parallel to the surface extension.

The invention also relates to a rigid-foam film which is preferably produced according to a method according to the invention. The rigid-foam film is made of a thermoplastic, extruded, in particular partially crystalline and/or closed-cell plastic rigid-foam material having a polymer structure stretched perpendicular to the rigid-foam film surface extension, the rigid-foam film or at least one of its surface sides, preferably both surface sides extending perpendicular to the thickness extension direction (surfaces having the greatest surface extension), are obtained by a knife cutting process, in particular in such a manner that no partial sealing of the surface side occurs or has occurred as a result of the cutting process. The rigid-foam film according to the invention has a minimum thickness extension of 2 mm, preferably of 3 mm, particularly preferably of 4 mm, particularly preferably of 5 mm, and/or of less than 10 cm, preferably less than 5 cm, more preferably less than 1 cm, particularly preferably in the range from 1 mm to 5 mm.

Particularly preferably, the surface sides having a greatest surface extension have side edges which extend at right angles to one another and which have a respective minimum longitudinal extension of 50 cm. Preferably, the longitudinal extension of all side edges delimiting the surface sides is chosen from a value range between 90 cm and 2.5 m, in particular between 1 m and 2 m, more preferably between 1 m and 1.5 m. Of course the invention is not limited to such an embodiment. The method according to the invention can also be applied to very long or endless blocks, for example, comprising in particular subsequent winding of the separated film section.

Furthermore, the invention also relates to a sandwich composite element whose at least one core layer is made of a rigid-foam film according to the invention sandwiched between at least two cover layers which are disposed on its surface sides and which are fixed to the core layer.

BRIEF DESCRIPTION OF THE DRAWINGS

Further advantages, features and details of the invention are apparent from the following description of preferred exemplary embodiments and from the drawings.

In the drawings.

DETAILED DESCRIPTION

Figure 1:
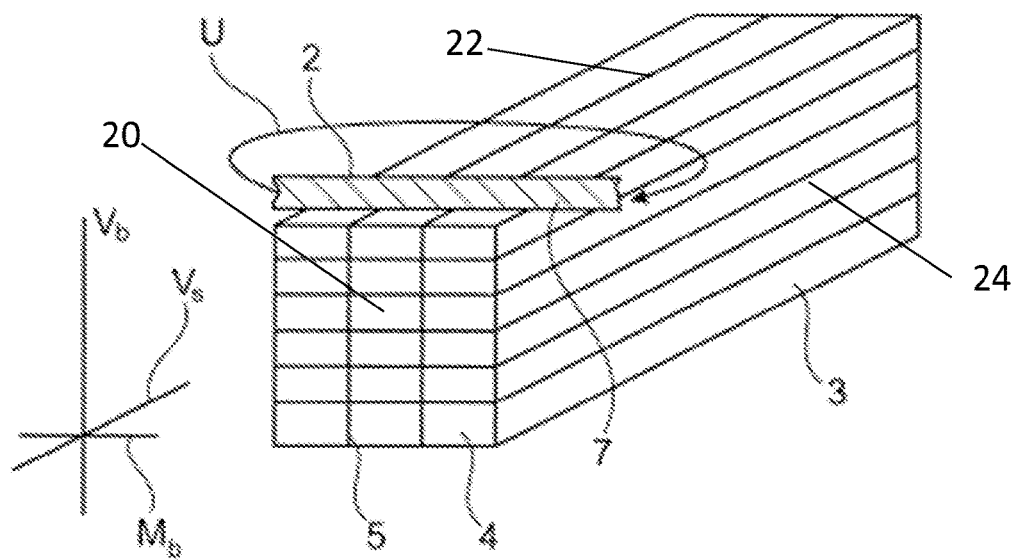
FIG. 1 shows a partial illustration of a rigid-foam film cutting device designed according to the idea of the invention for performing the method according to the invention, wherein, for the sake of clarity, the heating means are not shown.

In the figures, the same elements and elements having the same function are referenced with the same reference signs.

FIGS. 1 to 4 show different views and partially enlarged details of a rigid-foam film cutting device 1 designed according to the idea of the invention. Rigid-foam film cutting device 1 comprises relative movement means to create a relative movement along shown feed axis Vb between a knife 2 and a foam block 3; in the shown exemplary embodiment, foam block 3 has a front surface 20 and side surfaces 22, 24, and consists exclusively of a plastic rigid-foam material, in particular PET. The plastic rigid-foam material is a thermoplastic, partially crystalline plastic material which has closed-cell pores and which is obtained by extrusion. In the extrusion process, plastic material is subjected to high shear forces by means of propellant gas in an extruder and is pressed through a nozzle at the end of the extruder-downstream of the nozzle, the intended foaming process takes place by expansion of the gas. A polymer structure stretched in the extrusion direction is obtained by the extrusion process, more precisely the pressing though a nozzle. In the shown exemplary embodiment, foam block 3 is composed of a plurality of body segments 4 which are welded (alternatively bonded) to one another over their entire surface, a stiffening structure of, for example, crossing stiffening webs 5 resulting in a top view along a thickness extension axis Vs to be explained below, stiffening webs 5 either consisting of plastic melted by the welding process or, alternatively, of adhesive. As an alternative to the shown stiffening structure of crossing stiffening webs, it is also possible to realize exclusively parallel stiffening webs or alternative geometries as shown in FIGS. 3 to 8 of EP 1 536 944 B2, for example. It is also possible to not realize stiffening webs to produce rigid-foam films having small surfaces, for example.

Irrespective of the specific arrangement of the body segments or stiffening webs, foam block 3 or the plastic rigid-foam material of the foam block in any case has a stretched polymer structure along thickness extension axis $V_s$ which extends perpendicular to feed axis $V_b$ and perpendicular to a knife movement axis $M_b$. In other words, the compressive strength along thickness extension axis $V_s$ is higher or greater than perpendicular thereto.

Figure 3:
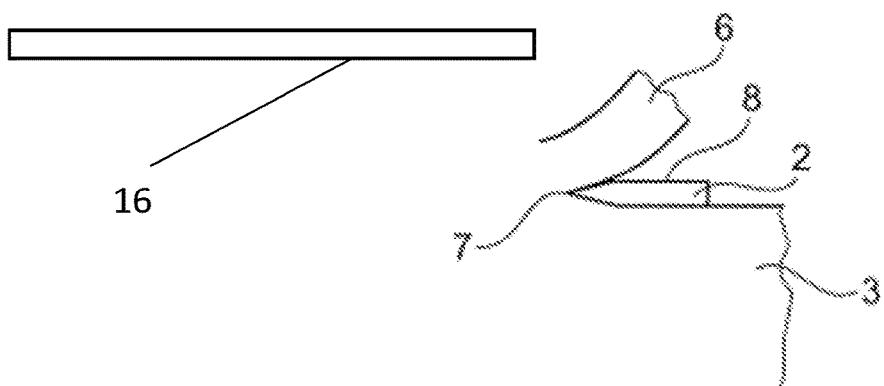
FIG. 3 shows an enlarged illustration of detail X of FIG. 2.

In the shown exemplary embodiment, knife 2 is realized as a band knife which rotates in a rotation direction U and which is displaced relative to foam block 3 along knife movement axis $M_b$ mentioned above in the area of foam block 3. The rigid-foam film 16, FIG. 3, is created in this way during the cutting process, in which a respective already separated film section 6 becomes longer along feed axis $V_b$ after passing a smooth cutting edge 7 of knife 2 as a result of the relative movement of foam block 3 and knife 2 along feed axis $V_b$. The cutting edge extends parallel to knife movement axis $M_b$ and perpendicular to feed axis $V_b$ and to thickness extension axis $V_s$.

Figure 2:
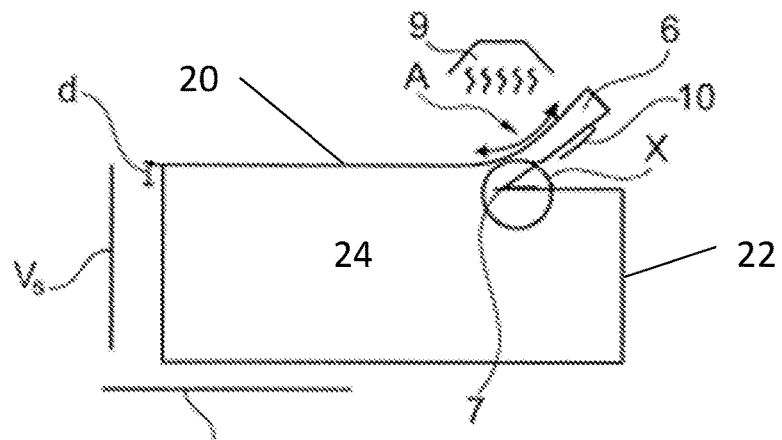
FIG. 2 shows a side view of the device according to FIG. 1 along a knife movement axis $M_b$ extending perpendicular to a feed axis $V_b$ and perpendicular to a thickness extension axis $V_s$.

The combined view of FIGS. 2 and 3 shows that separated film section 6 is bent away from knife 2 by elastic bending around a bending axis A in an area behind cutting edge 7 of knife 2. Bending axis A extends parallel to knife movement axis $M_b$. The elastic bending prevents large-scale contact of separated film section 6 with knife surface side 8 facing away from remaining foam block 6.

To allow such an elastic bending of separated film section 6 in the first place, the plastic rigid-foam material is heated to a processing temperature by means of heating means 9, in the present example in the form of an infrared radiator; at said processing temperature, the plastic rigid-foam material does not melt, but can be elastically deformed to be able to lift separated film section 6 from knife 2 as shown. In the present exemplary embodiment, the processing temperature is 80° C. Corresponding bending means 10 in the form of a ramp are provided for lifting and therefore bending separated film section 6 in the shown exemplary embodiments (see FIG. 2).

Other heating means can be realized as an alternative to the infrared radiator—relatively thick rigid-foam films, in particular rigid-foam films having a thickness extension d of more than 2 mm extending parallel to thickness extension axis $V_s$, whose polymer structure is stretched in thickness extension direction d can only be produced by heating the rigid-foam material to the processing temperature.

Figure 4:
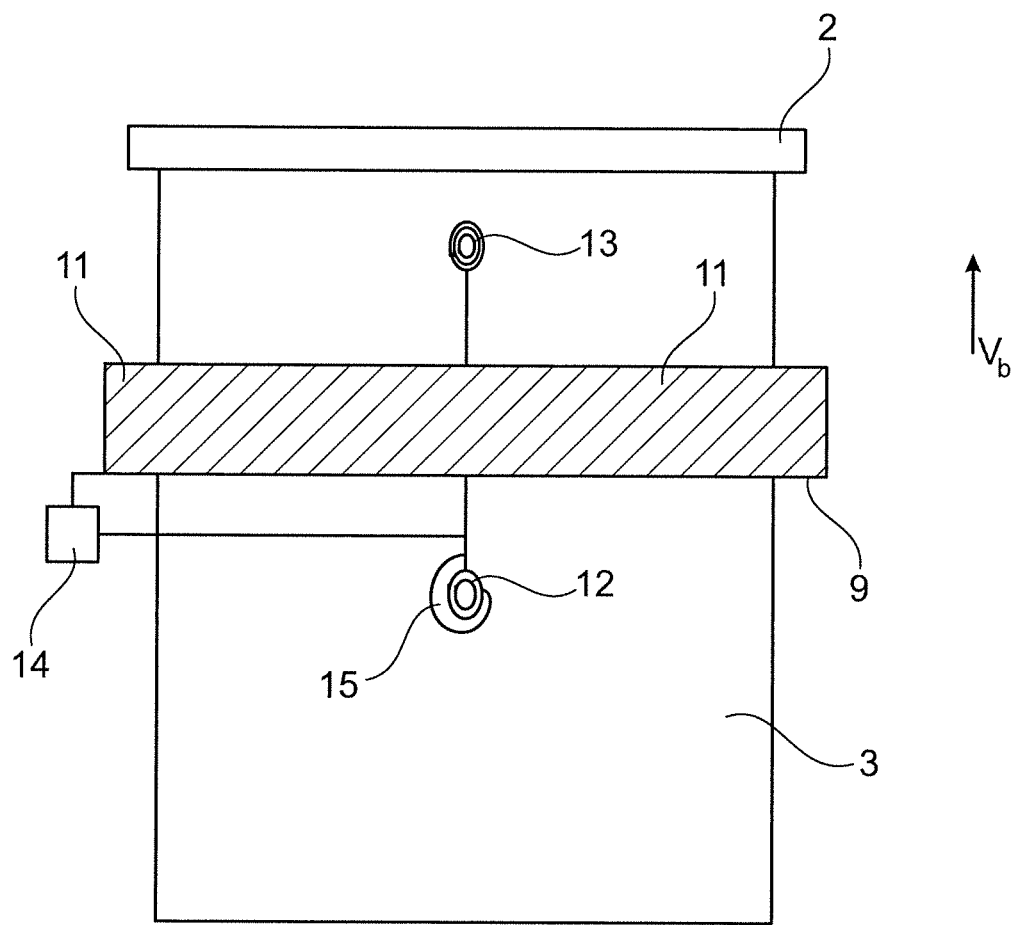
FIG. 4 shows a top view of the device according to FIG. 1 along thickness extension direction $V_s$.

FIG. 4 shows a section of device 1 according to the invention which is located in front of knife 2 in feed axis $V_b$. The top view of FIG. 4 along the thickness extension axis shows that heating means 9 are disposed above foam block 3, heating means 9 being designed as infrared heating means. The infrared heating means comprise individual heating devices 11 which are disposed at an angle to feed axis $V_b$ in order to ensure even warming or heating of foam block 3 over the entire width of foam block 3. Additionally, FIG. 4 shows that heating means 9 are wider than the width of foam block 3, which also contributes to even warming of foam block 3 over the entire width of foam block 3.

In FIG. 4, a first temperature sensor 12 and a second temperature sensor 13 are provided, at least first temperature sensor 12 being connected to a control unit 14 via a data connection; control unit 14, in turn, is connected to heating means 9 and can influence or control a control of heating means 9, in particular a control of the heat output or the radiant power of heating means 9. In the example of FIG. 4, another connection of temperature sensor 13 to control unit 14 can be provided in addition to a corresponding connection of first temperature sensor 12 to control unit 14, so that the surface temperatures of foam block 3 measured by temperature sensor 13 can also be provided to control unit 14 as a control variable.

In the example of FIG. 4, temperature sensors 12 and 13 are designed as pyrometers and perform a contactless measurement of the surface temperature of foam block 3 vertically downwards along thickness extension axis $V_s$. However, other arrangements and measurement directions of temperature sensors 12 and/or 13 can also be provided. Advantageously, however, temperature sensor 12 is disposed or aligned accordingly in front of heating means 9 along the feed axis at least to the extent that the respective surface temperature measured in a section 15 of the foam block during the time interval required for passing on the measured surface temperature to control unit 14, for generating a control variable for heating means 9 and for adjusting heating means 9 to a corresponding new or adapted radiant power, the respective surface temperature measured in a section 15 of the foam block corresponds to the time interval in which the foam block has just covered the distance which corresponds to the distance between measuring position 15 and the position of heating means 9. In other words, this means that the feed rate, the measuring position of the surface temperature and the inertia of the system are adapted to one another in such a manner for setting a changed radiant power that an optimal adaptation of the radiant power to the measured surface temperature can take place.

The controlled radiation of the heat output of heating means 9 ensures that no excessive thermal energy which can have a negative effect on a film section in the form of wave formation of the film section, for example, after the separation of the film section is introduced into the foam block. The heating means, in particular the infrared heating means, are adapted to the PET material or the PET-plastic rigid-foam material in such a manner that the penetration depth of the infrared rays and therefore the direct or primary heating of the PET material is at least equal to the thickness extension or thickness of the film to be separated or of the film section of the foam block to be separated. This ensures sufficient but not excessive heating over the entire layer thickness or thickness of the film section to be separated, which, on the one hand, allows advantageous lifting of the separated film section, but at the same time prevents excessive heating and thus a negative impact on the produced product, namely the separated film section.

REFERENCE SIGNS 1 rigid-foam film cutting device
2 knife
3 foam block
4 body segments
5 stiffening webs
6 separated film section
7 cutting edge
8 flat knife side
9 heating means
10 bending means
12 first temperature sensor
13 second temperature sensor
14 control unit
15 section/measuring position
$V_s$ thickness extension axis
$V_b$ feed axis
$M_b$ knife movement axis
A bending axis
d thickness extension
U circumferential direction

The invention claimed is:

1. A method for producing a rigid-foam film, the method comprising the steps of:
providing a foam block (3) made of a thermoplastic, extruded PET-plastic rigid-foam material selected from a partially crystalline PET-plastic rigid-foam material, a closed-cell PET-plastic rigid-foam material or combinations thereof, wherein the PET-plastic rigid-foam material has a higher compressive strength along a thickness extension axis ($V_s$) than along a surface extension axis perpendicular to the thickness extension axis ($V_s$),
cutting a film section (6) from the foam block (3) by cutting the foam block (3) by using a knife (2), which has a cutting edge (7), along a feed axis ($V_b$) extending perpendicular to the thickness extension axis ($V_s$), wherein the film section (6) is cut along the feed axis ($V_b$),
lifting and separating the film section (6) from the knife (2) by elastic bending of the film section (6) to reduce friction forces acting on the knife (2) during the cutting process,
wherein the PET-plastic rigid-foam material is at least partially heated by a heating means to a processing temperature above 40° C. and below the melting temperature of the PET-plastic rigid-foam material in such a manner that the PET-plastic rigid-foam material becomes se elastically bendable that the film section (6) can be elastic bent, lifted and separated from the cutting edge of the knife (2), and wherein the PET-plastic rigid-foam material of the film section returns to being rigid to form the rigid-foam film.

2. The method according to claim 1, wherein the heating means comprises an infrared heating means, the infrared heating means being adapted to the PET-plastic rigid-foam material in such a manner that a penetration depth of the infrared radiation is at least equal to a thickness of the film section (6) to be separated.

3. The method according to claim 2, wherein a surface temperature of the foam block is measured at a position disposed in front of the cutting edge and in front of a position of the infrared heating means in the feed axis ($V_b$) and the measured surface temperature serves as an input variable for controlling radiant power of the infrared heat source.

4. The method according to claim 1, wherein the PET-plastic rigid-foam material is at least partially heated to a processing temperature above the glass transition temperature of the PET-plastic rigid-foam material minus 20° C.; wherein the PET-plastic rigid-foam material is at least partially heated to a processing temperature below 180° C.; and combinations thereof.

5. The method according to claim 4, wherein the processing temperature is below 120° C.

6. The method according to claim 1, wherein the cutting process is performed in such a manner that the rigid-foam film resulting from the cutting process has a minimum thickness extension (d) of 0.5 mm and/or of less than 10 cm measured perpendicular to the surface extension.

7. The method according to claim 1, wherein for cutting, the knife (2) is moved relative to the foam block (3) along a knife movement axis ($M_b$) extending perpendicular to the thickness extension axis ($V_s$) and perpendicular to the feed axis ($V_b$), the knife (2) rotating in a rotation direction (U), or by a back-and-forth movement.

8. The method according to claim 1, wherein the knife (2) is free of saw teeth at the cutting edge (7) and/or comprises a metal band having a maximal material thickness from a value range between 1 mm and 5 mm.

9. The method according to claim 1, wherein the elastic bending is performed in such a manner that no plastic dimensional changes of the rigid-foam film results from the cutting process, except for interactions with the cutting edge (7).

10. The method according to claim 1, wherein the foam block (3) and/or the PET-plastic rigid-foam material and/or the rigid-foam film has a density from a value range between 40 kg/m$^3$ and 250 kg/m$^3$.

11. The method according to claim 1, wherein, when measured according to DIN 7726, the rigid-foam material has a compressive stress of more than 80 kPa at a compression of 10%.

12. The method according to claim 1, wherein the the heating means is an oven or wherein the heating means is an IR radiator in front of and/or in a contact area to the cutting edge (7) of the knife (2) along the feed axis ($V_b$).

13. The method according to claim 1, wherein the foam block (3) is composed of a plurality of extruded body segments (4), the body segments (4) being welded and/or bonded to one another at their contacting surface sides, parallel or crossing stiffening lines being formed as a result when viewing a surface side of the rigid-foam film along the thickness extension axis ($V_s$).

14. A sandwich composite element having a core layer made of the rigid-foam film according to claim 13 sandwiched between at least two cover layers disposed on its surface sides.

15. The rigid-foam film, produced by means of a method according to claim 1, made of a thermoplastic, extruded, partially crystalline and/or closed-cell, PET-plastic rigid-foam material having a polymer structure stretched perpendicular to the rigid-foam film surface extension, the rigid-foam film having at least one surface side obtained by a knife cutting process and a minimum thickness extension (d) of 2 mm measured perpendicular to the surface extension.

* * * * *